UNITED STATES PATENT OFFICE.

JOHN HENRY ALFRED D'ORSINI BOWMAN, OF MONTREAL, QUEBEC, CANADA, ASSIGNOR TO CANADIAN FILE & TOOL WORKS LIMITED, OF MONTREAL, CANADA.

CHEMICAL PROCESS FOR RECLAIMING FILES, RASPS, AND THE LIKE.

1,384,550.  Specification of Letters Patent.  Patented July 12, 1921.

No Drawing.   Application filed February 2, 1920.  Serial No. 355,678.

*To all whom it may concern:*

Be it known that I, JOHN HENRY ALFRED D'ORSINI BOWMAN, a subject of the King of Italy, and resident of the city of Montreal, in the Province of Quebec and Dominion of Canada, have invented certain new and useful Improvements in Chemical Processes for Reclaiming Files, Rasps, and the like, of which the following is a full, clear, and exact description.

This invention relates to a process for reclaiming, sharpening or resharpening files, rasps or like articles, and the main object of the invention is to provide a simple and inexpensive method of resharpening used or worn files, rasps or like articles which are usually thrown away as scrap.

Ordinarily, such tools after having been worn down on their sharp edges or teeth are thrown away as scrap steel. Occasionally, they are recut or reclaimed by mechanical processes or by sand blasting, but such methods have proved comparatively expensive. It has also been attempted to use certain acid solutions to recut such tools, but heretofore such methods have proved to be of little or no value chiefly on account of the acids eating into all parts of the surface of the metal uniformly.

My invention consists essentially in the following steps;—First, the tools are thoroughly cleaned by being placed in a cleaning solution. They are then dipped in a second solution having chemical properties capable of reacting to produce a gas which is evolved in the form of minute bubbles which adhere to the points or teeth of the tools in question, thus forming a protective covering to prevent action of the acid upon such parts while so protected. The acid of this solution eats into or cuts the grooves of the tool, and to a lesser degree the points or teeth, for a sufficient time to produce the desired results. Finally, the tools are thoroughly washed, cleaned and covered with a protective film adapted to prevent oxidation.

In carrying out my invention practically, I proceed as follows;—The worn or used files, rasps or like articles are first placed in rows in a lined vessel or container with their tangs or handles upward and between each row a sheet of zinc is inserted. The container is then filled with a strong solution of cyanid of potassium or caustic soda or caustic potash, which solution is kept at a temperature of approximately but not higher than 90° C. After exposing the tools for approximately thirty minutes in said solution for the purpose of thoroughly cleaning them, they are removed and rinsed repeatedly in warm clean water until all traces of the solution have been removed. The files or other tools are then placed in a suitable vessel containing a very weak solution of hydrochloric acid, in order to soften and remove any adhering rust or oxid of iron. They may then be cleaned with a brush or other suitable instrument, after which they are placed with their tangs or handles upward in an acid-proof vessel containing a solution consisting of approximately 968 parts of water, 110 parts of nitric acid and 22 parts of hydrochloric acid. This solution is kept at a fairly constant temperature, not exceeding 95° F. and the tools are immersed for a period of approximately thirty minutes. The chemical reaction which takes place between the material of the tools on the one hand and the acid solution on the other hand gives rise to a constant evolution of hydrogen, which adheres in the form of tiny bubbles to the projections or teeth of the files or rasps and thus protects them from being eaten away at the same rate as the unprotected grooves or depressions between the teeth. These unprotected grooves or depressions are thus acted upon by the acid solutions and eaten away sufficiently so that a new set of sharpened teeth or the like are formed on the face of the tool. The tools are kept in the acid solution for a period of approximately 30 to 60 minutes, depending on the strength of the solution and the amount of sharpening necessary, after which they are immersed in water and then cleaned with a brush or other suitable device.

For all practical purposes, the process is now completed, but I prefer to provide a protective film to prevent oxidation of the tool and this is done by immersing the tools in a vessel containing approximately 16 parts of water to 2 parts of a soluble oil and 1 part of carbonate of calcium or slaked lime. The soluble oil leaves on the tools an imperceptible film which protects the surfaces of the tool from oxidation. The carbonate of lime gives to the tools the appearance of new steel. After being thoroughly dried, the tools are ready for re-use.

This process may be repeated indefinitely until the material has been worn too thin for further use. The sharpened teeth of the files or other articles are uniform and as no heat sufficient to damage the temper of the tools is employed, they are made practically as good as when new.

Although I have found that the chemical reaction between the material of the tool steel and the acid is quite sufficient to produce an evolution of gas bubbles, it may be found expedient in some cases to add to the acid solution a carbonaceous ingredient adapted to expedite this evolution of hydrogen bubbles. I do not wish, however, to limit my process by the inclusion of such a step in my process, I have also included as a preferable step the cleaning of the tools as a preliminary operation. While this cleaning operation is desirable in all cases and necessary in some cases when the tools are covered with foreign matter, I do not wish to be confined to the particular method of cleaning that I have described. It will be obvious also that the final step of immersing the tools in the oil and lime solution is not essential to the cutting or sharpening process, which constitutes the principal or basic feature of this invention.

Having thus described my invention, what I claim is;—

1. A process of sharpening or recutting tools and the like, which consists in immersing the tools in an acid solution capable of evolving a gas which adheres in minute bubbles to the projections of the tool, thus protecting said projections from the full chemical action of the acid solution while allowing said action to take place in the grooves, depressions or other surfaces of the tool.

2. A process which consists in first cleaning tools by immersing them in an alkaline solution, secondly immersing the tools in an acid solution capable of evolving a gas, and thirdly by immersing the tools in a solution containing a soluble oil.

3. A process which consists in first immersing the tools in an alkaline solution, secondly immersing them in an acid solution, and finally immersing the tools in a solution containing soluble oil and calcium carbonate.

4. A process of sharpening tools, which consists in immersing the tools in a solution of approximately 968 parts of water, 110 parts of nitric acid and 22 parts of hydrochloric acid.

5. A process according to claim 4 including the addition of a protective film to the tool by immersion in a solution of 16 parts of water, 2 parts of oil and 1 part of carbonate of calcium.

6. A process which consists in immersing the tools in a cleaning solution of caustic alkali, then immersing the tools in an acid solution capable of reacting to evolve hydrogen gas, and then immersing the tools in a solution containing a soluble oil.

In witness whereof, I have hereunto set my hand.

JOHN HENRY ALFRED D'ORSINI BOWMAN.